US012748062B2

(12) United States Patent
Meng et al.

(10) Patent No.: US 12,748,062 B2
(45) Date of Patent: Sep. 29, 2026

(54) FAST NONDESTRUCTIVE METHOD TO EVALUATE THE CURATIVE SYSTEM OF RUBBER GOODS

(71) Applicants: CNPC USA CORP., Houston, TX (US); BEIJING HUAMEI INC., Beijing (CN); CHINA NATIONAL PETROLEUM CORPORATION, Beijing (CN)

(72) Inventors: Scott Meng, Houston, TX (US); Timothy Dunne, Houston, TX (US); Yang Fang, Beijing (CN); Huailiang Liu, Beijing (CN)

(73) Assignees: CNPC USA CORPORATION, Houston, TX (US); BEIJING HUAMEI INC., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 17 days.

(21) Appl. No.: 18/495,481

(22) Filed: Oct. 26, 2023

(65) Prior Publication Data

US 2025/0137949 A1 May 1, 2025

(51) Int. Cl.
*G01N 23/223* (2006.01)

(52) U.S. Cl.
CPC ..... *G01N 23/223* (2013.01); *G01N 2223/623* (2013.01)

(58) Field of Classification Search
CPC ....... G01N 2001/002; G01N 2001/007; G01N 1/40; G01N 23/00; G01N 23/005; G01N 23/02; G01N 23/025; G01N 23/05; G01N 23/083; G01N 23/09; G01N 23/085; G01N 23/095; G01N 23/18; G01N 23/22; G01N 23/2206; G01N 23/221; G01N 23/223; G01N 23/222
See application file for complete search history.

(56) References Cited

U.S. PATENT DOCUMENTS 4,885,254 A * 12/1989 Sung .................... G01N 21/643
534/689

FOREIGN PATENT DOCUMENTS

WO 2002103710 A2 12/2002
WO 2013/180922 A2 5/2013

OTHER PUBLICATIONS

International search report and written opinion for PCT/US23/78974, received on Mar. 21, 20224.
XRF Sulfur Analyzers: https://www.xos.com/products/sulfur-analyzers?gclid=CjwKCAjwlJimBhAsEiwA1hrp5ooatFuPewLZAe589Ei7RJiD41dnN4JS7m5QH4iO2-kKfYlgLoDAdBoCB2oQAvD_BwE#analyzers, last visited on Jun. 19, 2024.

* cited by examiner

*Primary Examiner* — Don K Wong
(74) *Attorney, Agent, or Firm* — Frank Gao, Esq.

(57) ABSTRACT

The patent application discloses a method for nondestructively determining information of an element disposed within a polymer body comprising a cure system extending continuously throughout. The method comprises the steps of directing x-rays onto a surface of the body, wherein the x-rays are directed through the body, and wherein target atoms in the cure system of the polymer body emit x-ray fluorescence; and receiving the x-ray fluorescence and determining composition information of the cure system within the body.

20 Claims, 3 Drawing Sheets

FAST NONDESTRUCTIVE METHOD TO EVALUATE THE CURATIVE SYSTEM OF RUBBER GOODS

TECHNICAL FIELD AND INDUSTRIAL APPLICABILITY

The present invention is in the field of X-Ray-Fluorescence (XRF) and techniques for reading XRF signals indicative of materials and compositions of polymers, particularly relates to a fast nondestructive method to evaluate the curative system of rubber goods.

BACKGROUND

X-ray fluorescence (XRF) marking is a technique used to detect and possibly quantify chemical material elements and/or composition constituents which can serve for marking an object. The parameters/identity of an object can then be identified based on the detected materials.

In the following, X-ray fluorescence (XRF) is used to refer to the emission of characteristic "secondary" (or fluorescent) X-rays from a material that has been excited by primary X-rays or gamma rays radiation. The term fluorescence refers to absorption of radiation of a specific energy resulting in the re-emission of radiation of a different energy (typically lower). The X-ray fluorescence (XRF) phenomenon is based on the fact that when materials are exposed to short-wavelength X-rays or gamma rays, they may expel electrons from inner orbitals of the atom, which thus cause electrons in higher orbitals to "fall" into the lower/inner orbital, and, in the process, release photons with energy equal to the energy difference between the two orbitals involved. Different chemical elements have electronic orbitals/shells of different characteristic energies, and therefore the spectral profile of an XRF response from an object/material is indicative of the chemical elements and possibly of the amount of each element included in the material/object.

Rubber goods or articles must contain the curative systems in the formulation to achieve mechanical strengths, vibration damping properties, and sealing performance. The curative systems for rubber can be categorized into two main groups: the sulfur system and the peroxide system. The detection of rubber curative systems is of special value for the quality control of rubber production and/or the research and development of rubber composites. The conventional method to detect rubber curative system is GC-MS (Gas Chromatography-Mass Spectrometry) method, which involves multiple steps of cutting a small piece from rubber, dissolving the sample in the organic solvent(s), filtering the solution in the GC column, and analyzing the constitutes by MS, among others. As can be seen, the conventional GC-MS method has the following drawbacks:

1) Destructive (needs to cut a piece from sample)
2) Time-consuming (normally takes over 24 hrs)
3) Unfriendly to environment (needs organic solvent such as chloroform)
4) Costly (>$500 per sample)

There is a need, therefore, to have an effective and quick examining system to determine the composition of the cure system in the rubber goods.

SUMMARY

In one aspect, one embodiment discloses a method for nondestructively determining information of an element disposed within a polymer body comprising a cure system extending continuously throughout. The method comprises the steps of: directing x-rays onto a surface of the body, wherein the x-rays are directed through the body, and wherein target atoms in the cure system of the polymer body emit x-ray fluorescence; and receiving the x-ray fluorescence and determining composition information of the cure system within the body.

Optionally in any aspect, the method comprises directing x-rays onto a number of places on the surface, and receiving each respective x-ray fluorescence.

Optionally in any aspect, the steps of directing and receiving are conducted over an entire surface of the body.

Optionally in any aspect, wherein the cure system in the polymer body comprises a sulfur cure system or a peroxide cure system.

Optionally in any aspect, the polymer body comprises rubber materials.

Optionally in any aspect, the target atoms comprise sulfur.

Optionally in any aspect, the target atoms comprise oxygen.

Optionally in any aspect, the method further comprises X-ray energy's passing to the target atoms in the cure system of the polymer body.

Optionally in any aspects, the step of determining composition information of the cure system within the polymer body comprises the step of basing a standard composition of the cure system.

Optionally in any aspects, the standard composition of the cure system comprises sulfur standard.

Optionally in any aspects, the standard composition of the cure system comprises oxygen standard.

Further in another aspect, one embodiment discloses a method for nondestructively obtaining measurement information of target atoms disposed within polymeric materials comprising a cure system extending continuously throughout. The method may comprise the steps of directing x-ray energy onto a surface of the polymeric materials; and receiving the fluorescence and determining the measurement information of the target atoms therefrom. The X-ray energy passes to the target atoms in the construction to emit fluorescence.

Optionally in any aspects, the cure system in the polymer body comprises a sulfur cure system or a peroxide cure system.

Optionally in any aspects, the target atoms are disposed in the polymeric materials.

Optionally in any aspects, the target atoms comprise sulfur.

Optionally in any aspects, the target atoms comprise oxygen.

In yet another aspect, one embodiment discloses a method for nondestructively examining a cure system of a polymeric materials having the cure system extending therethrough. The method comprises steps of directing x-ray energy onto a surface of the polymeric materials, wherein the x-ray energy passes to one or more target atoms in the construction, and wherein the one or more target atoms emit fluorescence; and receiving the fluorescence and from it examining information relating to a percentage of the target atoms within the polymeric materials.

Optionally in any aspects, the cure system in the polymer body comprises a sulfur cure system or a peroxide cure system.

Optionally in any aspects, comprising a step of determining the cure system is a sulfur cure system or a peroxide cure system is based on a percentage of the target atoms with the polymeric materials.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED EMBODIMENTS

Definitions

Figure 1:
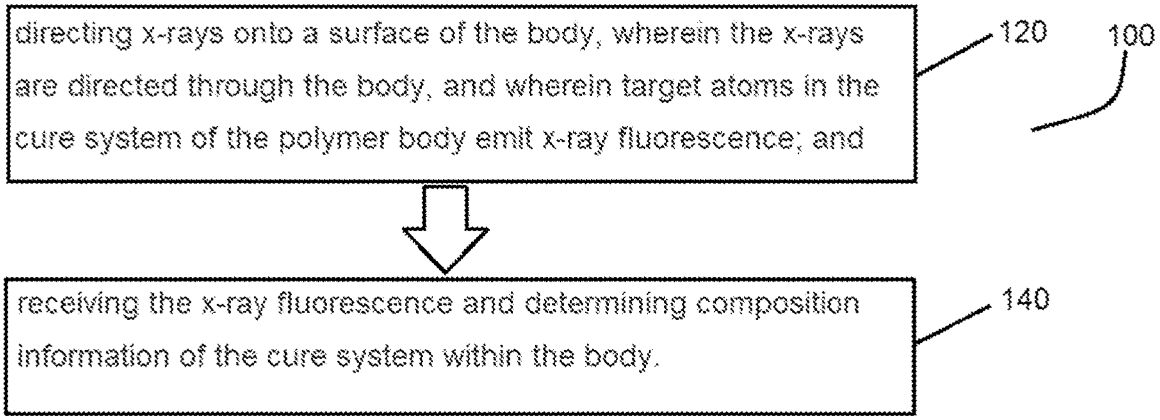
FIG. 1 illustrates a flow diagram of a method 100 for nondestructively determining information of an element disposed within a polymer body in accordance with one embodiment of the present invention.

Unless otherwise indicated, all numbers expressing quantities of ingredients, properties such as size, weight, reaction conditions and so forth used in the specification and claims are to the understood as being modified in all instances by the term “about”. Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms “a,” “an,” and “the” include plural reference unless the context clearly dictates otherwise.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All percentages for weights expressed herein are by weight of the total product unless specifically stated otherwise.

The technical means, creative features, objectives, and effects of the patent application may be easy to understand, the following embodiments will further illustrate the patent application. However, the following embodiments are only the preferred embodiments of the utility patent application, not all of them. Based on the examples in the implementation manners, other examples obtained by those skilled in the art without creative work shall fall within the protection scope of the present invention. The experimental methods in the following examples are conventional methods unless otherwise specified. The materials and reagents used in the following examples can be obtained from commercial sources unless otherwise specified.

EXEMPLARY EMBODIMENTS

A nondestructive method useful for determining information of an element disposed within a polymer body comprising a cure system extending continuously throughout, according to the principles of this invention, is X-ray fluorescence (XRF). As described in in better detail below, XRF is used to determine the percentage of sulfur or peroxide in the cure system in the polymeric materials in a manner that is accurate and that does not result in the destruction of the part.

The present invention provides a novel technique for reading XRF markings of objects (e.g. solid materials, such as polymeric materials) with improved accuracy and reliability. The technique of the invention facilitates use of handheld/portable XRF readers for reading XRF markings of objects in un-controlled environments (e.g. in-situ, where the object to be examined is found/located). More specifically, certain embodiments of the present invention provide a novel XRF signal processor and XRF signal processing method allowing to extract an accurate XRF signature (i.e. hereinafter also indicated as fingerprint) of the examined object, even from a relatively noisy signal of deteriorated SNR and/or SCR obtained from handheld/portable XRF readers which may be operated in an un-controlled environment.

It should be noted that here and in the following, the phrase uncontrolled environment should be understood as any environment such as outdoors, where the XRF signal propagates to the detector through the ambient media/air without vacuum conditions and where contaminating objects/material which may reside near/on the examined material are not necessarily removed away before the examination. It should also be noted that the terms handheld and portable when used herein in the context of the XRF device indicate a device that can be configured to be carried by personnel and which is operable in situ to perform the XRF reading.

Thus in certain embodiments the XRF signal processor and/or XRF signal processing method of the present invention are used to accurately extract XRF signatures from a noisy XRF signal. As indicated above, the processing method/system of the invention may be used for processing XRF signals obtained by handheld/portable XRF readers. Accordingly, certain aspects of the present invention are directed to a novel XRF device incorporating the XRF signal processor and/or XRF signal processing method of the present invention. Certain embodiments of the present invention also provide a novel handheld/portable XRF device configured to include the XRF signal processor of the invention and/or to be in communication with the XRF signal processor (e.g. possibly residing at a processing center) of the invention and adapted for operating the XRF signal processor to filter the spectrum of the XRF signal read by the handheld/portable XRF device and extract an XRF signature therefrom.

The technique of the invention facilitates use of handheld/portable XRF readers for reading XRF markings of objects in un-controlled environments (e.g. in-situ where the object to be examined is found/located). More specifically, certain embodiments of the present invention provide a novel solution, allowing to extract an accurate XRF signature (i.e. hereinafter also indicated as fingerprint) of the examined object, even from a relatively noisy signal of deteriorated SNR and/or SCR obtained from handheld/portable XRF readers which may be operated in un-controlled environments.

In some embodiments, the method of the invention also includes irradiating the object with the X-Ray or Gamma-Ray radiation; detecting a portion of an X-Ray signal arriving from the object in response to the radiation applied to the object; and applying spectral processing to the detected X-Ray signal to obtain data indicative of wavelength spectral profile thereof within a certain X-Ray band.

According to some embodiments of the invention, the wavelengths and possibly also the magnitudes of the one or more peaks are used to determine material data indicative of types and possibly also concentrations of materials included in the object. The material data is then utilized to authenticate the object.

FIG. 1 illustrates a flow chart illustrating in more detail a method 100 for processing XRF signals according to certain embodiments of the present invention. The method 100 for nondestructively determining information of an element disposed within a polymer body, such as rubber, comprises steps of directing x-rays onto a surface of the body in a step 120; and receiving the x-ray fluorescence and determining composition information of the cure system within the body in a step 140. The x-rays may be directed through the body, and target atoms, such as sulfur or oxygen, in the cure system of the polymer body emit x-ray fluorescence. The cure system in the polymer body comprises a sulfur cure system or a peroxide cure system.

The method 100 may further comprise steps of directing x-rays onto a number of places on the surface, and receiving each respective x-ray fluorescence; X-ray energy's passing to the target atoms in the cure system of the polymer body. The steps of directing and receiving are conducted over an entire surface of the body. In one embodiment, the step of determining composition information of the cure system within the polymer body may comprise basing a standard composition of the cure system, such as sulfur standard or oxygen standard, for example.

Figure 2:
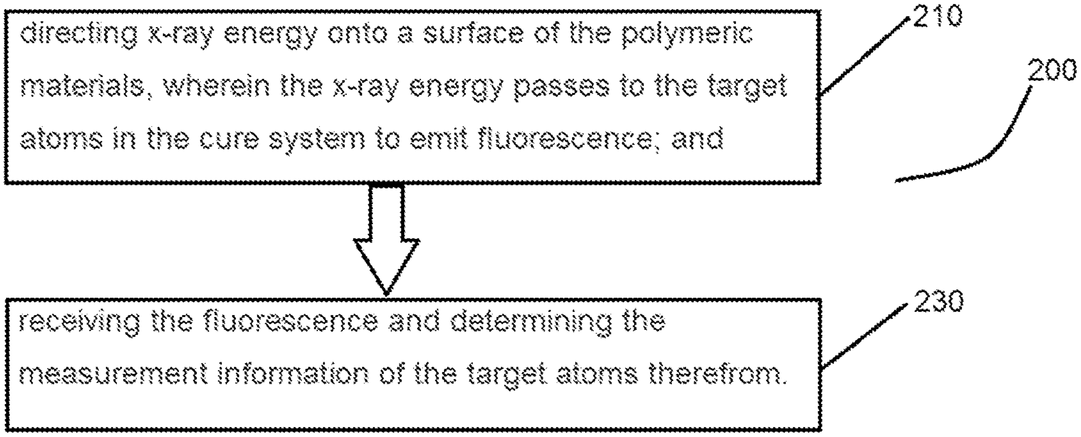
FIG. 2 illustrates a flow diagram of a method for nondestructively obtaining measurement information of target atoms disposed within polymeric materials in accordance with another embodiment of the present invention.

Alternatively, as shown in FIG. 2, a method 200 is shown as a flow chart for nondestructively obtaining measurement information of target atoms disposed within polymeric materials having a cure system, such as a sulfur cure system or a peroxide cure system, extending continuously throughout. The method 200 may comprise steps of directing x-ray energy onto a surface of the polymeric materials, wherein the x-ray energy passes to the target atoms, such as sulfur or oxygen, for example, in the cure system to emit fluorescence in a step 210; and receiving the fluorescence and determining the measurement information of the target atoms, such as sulfur or oxygen, in a step 230. The target atoms may be disposed in the polymeric materials.

Figure 3:
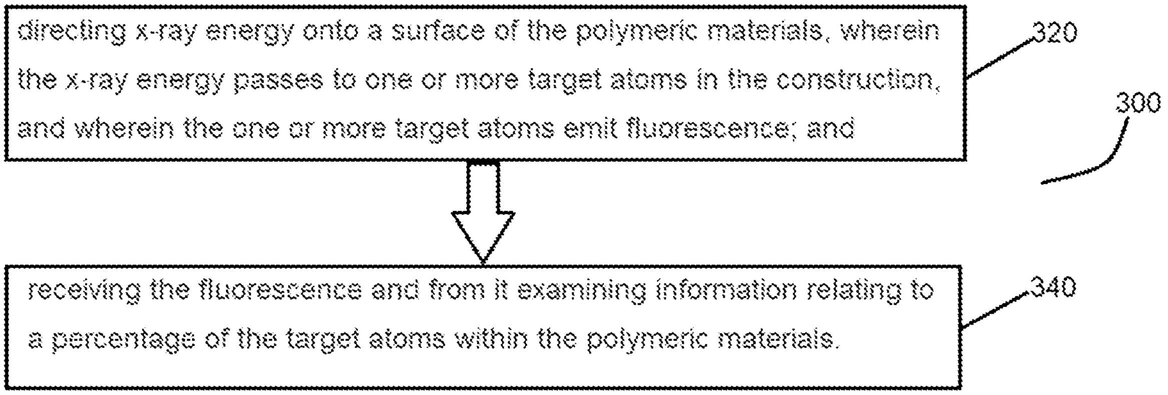
FIG. 3 illustrates a flow diagram of a method for nondestructively examining a cure system of a polymeric materials in accordance with yet another embodiment of the present invention.

Further alternatively, as shown in FIG. 3, a method 300 is shown as a flow chart for nondestructively examining a cure system, such as a sulfur cure system or a peroxide cure system, of a polymeric materials having the cure system extending therethrough. The method 300 may comprise steps of directing x-ray energy onto a surface of the polymeric materials, wherein the x-ray energy passes to one or more target atoms in the construction, and wherein the one or more target atoms emit fluorescence in step 320; and receiving the fluorescence and from it examining information relating to a percentage of the target atoms within the polymeric materials in a step 340. In one embodiment, the method 300 may comprise a step of determining the cure system is a sulfur cure system or a peroxide cure system basing on a percentage of the target atoms with the polymeric materials.

It should be noted that generally the XRF device of the present invention may be implemented by analogue and/or digital means. In some cases, the XRF device includes a computerized system including a computer processor (CPU) and a memory. The modules of the device may thus be implemented by suitable circuitry and/or by software and/or hardware components including computer readable code configured for implementing the operations of methods 100, 200 and/or 300 described above.

The XRF device of the present invention may be implemented as part of an XRF signal processing center, and/or as a portable (e.g. handheld) XRF reading device.

Figure 4:
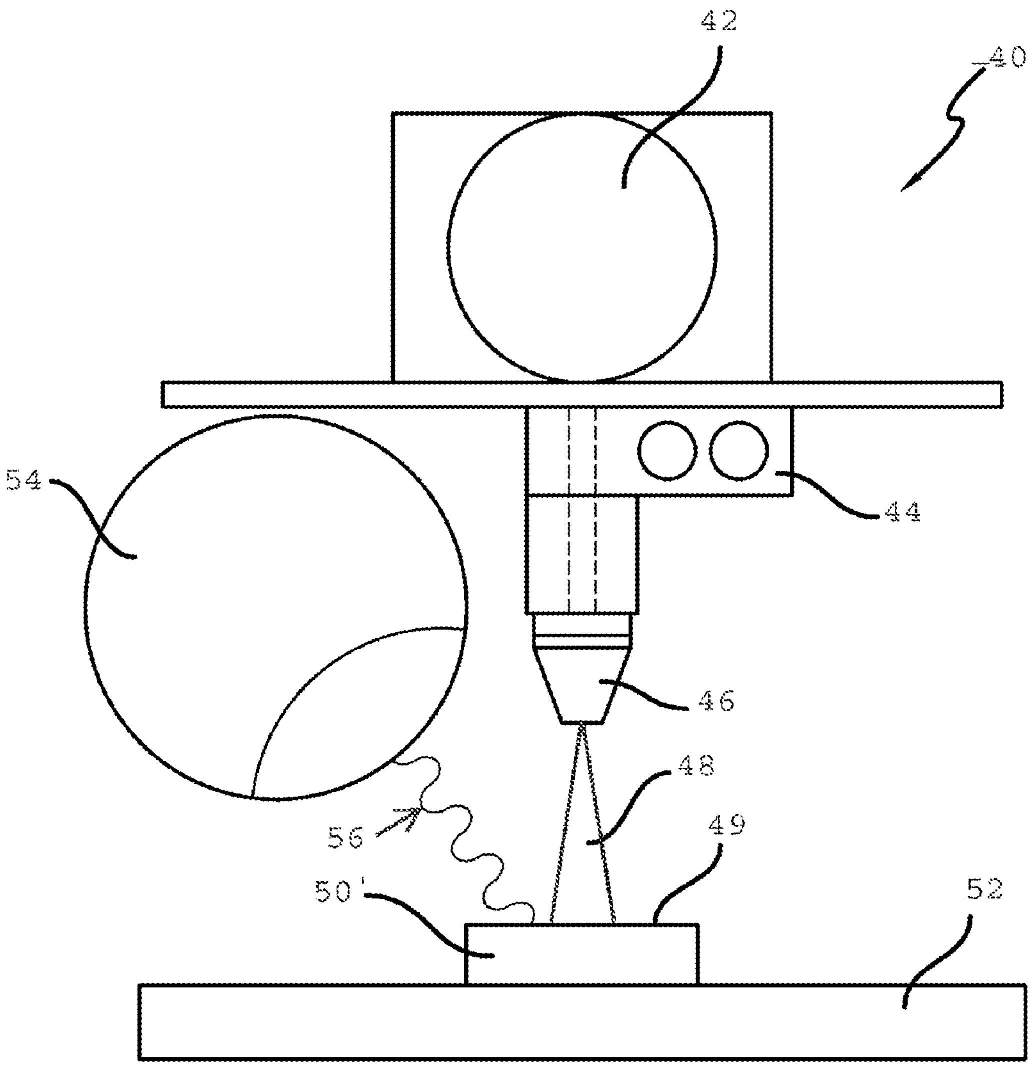
FIG. 4 is a schematic side view of an X-ray fluorescence device useful for providing qualitative and/or quantitative information relating to the polymeric materials.

An XRF device of the invention implemented as a machine or as a handheld/portable XRF reader is illustrated in a diagram in FIG. 4. FIG. 4 illustrates an XRF device 40 as used to provide qualitative and/or quantitative information relating to the material microstructure of one or more regions in polymeric materials, such as rubber goods. In an exemplary embodiment, the device 40 comprises an x-ray source 42 and may include a fail-safe shutter 44 and a collimator 46. The collimator is used to direct an incident x-ray 48 onto a desired surface 49 of the polymeric materials 50 that is positioned on a suitable positioning assembly 52. In an example embodiment, the positioning assembly and/or the x-ray source can be configured to move if necessary to provide extended coverage over a desired region of the polymeric materials 50.

The device 40 further includes a proportional counter 54 that may be a part of or separate from the device. The proportional counter may comprise a gas disposed within a counter tube, which gas is ionized by the emission of x-rays or photons from the target material. The emitted x-rays or photons 56 ionize gas in the counter tube that is proportional to their energy, permitting spectrum analysis for determining the desired qualitative and quantitative feature of the target material.

In an example embodiment, the polymeric material 50 is oriented with the device 40 so that the device emits x-ray energy 48 onto a desired surface of the polymeric materials to target a desired region of the polymeric materials with a cure system disposed within. In one example, the polymeric materials 50 is oriented with the device 40 to emit x-ray energy 48 onto the surface 49 to provide quantitative and/or qualitative information relating to a region of the polymeric materials extending from the surface a depth into the construction. It is to be understood that the construction and device can be oriented in a variety of different configurations for the purpose of obtaining qualitative and/or quantitative information as it relates to differently oriented regions of the construction microstructure.

The device can be configured having an x-ray source 42 that is specially selected to produce x-ray energy intended to create a void in the inner shell of the desired target element. The target element can be selected from any number of the different materials known or suspected to be within the polymeric materials, and the choice may depend on the particular performance feature that is being evaluated. For example, if a performance feature being evaluated is the thermal stability of the construction, then the target element selected may be the cure material, such as sulfur or peroxide, and the XRF device 40 is then used to provide qualitative and/or quantitative information relating to the cure system of the polymeric materials, e.g., rubber goods, for example, its amount and/or location and/or distribution adjacent a working surface of the polymeric materials.

Alternatively, it may be desired to detect the presence, amount, location, and/or distribution of any material known to be used during the processing of the raw materials used to form the polymeric materials, e.g., to evaluate the effects if any of such materials on the performance properties of the construction. It may therefore be desirable to select sulfur or oxygen as a target element to evaluate its presence and consistency in the construction and its possible impact or contribution to the performance properties of the construction.

In another example, it may be desired to evaluate a region of the construction that can only be evaluated by sectioning the construction, in which case the construction is sectioned prior to being positioned for XRF analysis. In an example embodiment, for example, where it may be desired to obtain information relating to a target element and its composition in the polymeric materials, wherein the information regarding the cure system can relate to whether the cure system is sulfur system or peroxide system. Once prepared, the sectioned portion of the construction can be positioned adjacent the XRF device to emit X-rays onto a region of the construction extending along the exposed section. Accordingly, it is to be understood that while the XRF device and method for using the same does not require destructive treatment of the object being evaluated, it can be used on such sectioned objects if information relating to a particular, e.g., not otherwise accessible, region is desired.

In another example, the target element can be one that is already present during the powder assembly of the different materials used to form the assembly for polymeric materials. Alternatively, the target element may be one that is intentionally added as a tracer to later track its position. The XRF technique can then be used to provide quantitative and/or qualitative information relating to the content or position of such selected element at a state before the powder assembly is subjected to the polymeric process to evaluate the effectiveness of the polymerization process.

A feature of using the XRF technique is that because it is noninvasive, it enables a user to conduct an evaluation of the polymeric material synthesis at different stages of manufacturing. For example, it can be used to evaluate the construction after it has been vulcanized, before it has been vulcanized, or at different stages of the vulcanizing process.

Experimental

A piece of polymeric materials, such as rubber goods, was put under the XRF machine shown in FIG. 4 or alternatively, under a handhold or portable XRF device. The device was configured to emit x-rays onto a designated surface area of the rubber goods. X-rays that were generated by the device pass through the rubber goods. The XRF emitted from the targeted elements in the rubber goods associated with the designated surface area was measured. In an example embodiment, the XRF emitted provided information relating to percentage of the targeted element, such as sulfur, oxygen, for example.

As shown in the following Table 1, four points of baseline sample had been measured with multiple repeats. The first point had sulfur reading about 1.04%, 4.52%, 3.72%. The second point has sulfur reading about 3.54%, 3.56%. The third point had sulfur reading about 3.62%, 4.21%. The third point had sulfur reading about 2.45%, 3.61%. Comparing control standard from peroxide cure control standard having sulfur content about 5.54% or sulfur cure control standard having sulfur content about 23.62%, we could assume the rubber goods was a peroxide system since it is close to 5.54% sulfur reading of peroxide cure control standard.

To verify the result, a GC-MS system was used to test one piece of rubber. The results were shown in Table 2.

TABLE 1

Curative System Analysis Results from Newly Developed XRF Method

| Sample | % Sulfur reading from Unit | Notes |
|---|---|---|
| Sulfur Cure Control Standard | 23.62% | |
| Peroxide Cure Control Standard | 5.54% | |
| Baseline Sample point 1 (Repeats) | 1.04%, 4.52%, 3.72% | Peroxide system |
| Baseline Sample point 2 (Repeats) | 3.54%, 3.56% | Peroxide system |
| Baseline Sample point 3 (Repeats) | 3.62%, 4.21% | Peroxide system |
| Baseline Sample point 4 (Repeats) | 2.45%, 3.61% | Peroxide system |

TABLE 2

Curative System Analysis Results from GC-MS Method

| Sample | Chromatogram I.D. | Chemicals Detected |
|---|---|---|
| HNBR Compound Reference 90D | TIC: A168612B.D | alpha, -methylstyrene*<br>benzene, 1,3-bis(1-methylethenyl)-*<br>benzene, 1,4-bis(1-methylethenyl)-*<br>ethanone, 1-[4-(1-methylethyl)phenyl]-*<br>ethanone, 1-(2,3-dihydro-1H-inden-5-yl)-*<br>ethanone, 1,1'-(1,4-phenylene)bis-*<br>Best Match: 1,3-benzenedimethanol, a.a.a',a'-tetramethyl-*<br>Best Match: ethanone, 1-[4-(1-hydroxy-1-methylethyl)phenyl]-*<br>BHT<br>TAIC<br>Vanox SKT<br>oleanitrile<br>octadecanenitrile<br>methyl stearate<br>decanedioic acid, dibutyl ester<br>hexadecanamide<br>Kemamide O<br>stearic acid, butyl ester<br>Best Match: Plasticizer SC<br>DOP/DEHP<br>Best Match: Naugard 445<br>DOTP<br>DINP<br>TOTM<br>Best Match: Steroid Fragment |

*Peroxide cure fragments from a peroxide cross-linking agent. The exact peroxide agent used is difficult to determine, but the best match to the fragments detected is Di(tert-butylperoxyisopropyl)benzene (trade name Luperox F).
The chromatogram (TIC: A168612B.D) is labeled and enclosed.

The peroxide cure fragments were shown from a peroxide cross-linking agent. The prediction of the curative system of baseline samples based upon the new method was in line with that from GC-MS method.

Other modifications and variations of using XRF techniques and methods to measure the microstructure of the cure system of the polymeric materials will be apparent to those skilled in the art. It is, therefore, to be understood that within the scope of the appended claims, this invention may be practiced otherwise than as specifically described. Although only a few exemplary embodiments of this invention have been described in detail above, those skilled in the art will readily appreciate that many modifications are possible in the exemplary embodiments without materially departing from the novel teachings and advantages of this invention.

Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

The above shows and describes the basic principles, main features and advantages of the utility patent application. Those skilled in the industry should understand that the present utility patent application is not limited by the above-mentioned embodiments. The above-mentioned embodiments and the description are only preferred examples of the present utility patent application and are not intended to limit the present utility patent application, without departing from the present utility patent application. Under the premise of spirit and scope, the present utility patent application will have various changes and improvements, and these changes and improvements fall within the scope of the claimed utility patent application. The scope of protection claimed by the utility patent application is defined by the appended claims and their equivalents.

We claim:

1. A method for nondestructively determining information of an element disposed within a polymer body comprising a cure system extending continuously throughout, wherein the method comprises the steps of:

directing x-rays onto a surface of the body, wherein the x-rays are directed through the body, and wherein target atoms in the cure system of the polymer body emit x-ray fluorescence; and receiving the x-ray fluorescence and determining composition information of the cure system within the body.

2. The method as recited in claim 1 further comprising directing x-rays onto a number of places on the surface, and receiving each respective x-ray fluorescence.

3. The method as recited in claim 1, wherein the steps of directing and receiving are conducted over an entire surface of the polymer body.

4. The method as recited in claim 1, wherein the cure system in the polymer body comprises a sulfur cure system or a peroxide cure system.

5. The method as recited in claim 1, wherein the polymer body comprises rubber materials.

6. The method as recited in claim 1, wherein the target atoms comprise sulfur.

7. The method as recited in claim 1, wherein the target atoms comprise oxygen.

8. The method as recited in claim 1, wherein the cure system in the polymer body comprises a sulfur cure system.

9. The method as recited in claim 1 further comprising X-ray energy's passing to the target atoms in the cure system of the polymer body.

10. The method as recited in claim 1, wherein the step of determining composition information of the cure system within the polymer body comprising basing a standard composition of the cure system.

11. The method as recited in claim 10 wherein the standard composition of the cure system comprises sulfur standard.

12. The method as recited in claim 10 wherein the standard composition of the cure system comprises oxygen standard.

13. A method for nondestructively obtaining measurement information of target atoms disposed within polymeric materials comprising a cure system extending continuously throughout, the method comprising the steps of:

directing x-ray energy onto a surface of the polymeric materials, wherein the x-ray energy passes to the target atoms in the cure system to emit fluorescence; and receiving the fluorescence and determining the measurement information of the target atoms therefrom.

14. The method as recited in claim 13, wherein the cure system in the polymer body comprises a sulfur cure system or a peroxide cure system.

15. The method as recited in claim 13, wherein the target atoms are disposed in the polymeric materials.

16. The method as recited in claim 13, wherein the target atoms comprise sulfur.

17. The method as recited in claim 13, wherein the target atoms comprise oxygen.

18. A method for nondestructively examining a cure system of a polymeric materials having the cure system extending therethrough, the method comprising:

directing x-ray energy onto a surface of the polymeric materials, wherein the x-ray energy passes to one or more target atoms in the construction, and wherein the one or more target atoms emit fluorescence; and receiving the fluorescence and from it examining information relating to a percentage of the target atoms within the polymeric materials.

19. The method as recited in claim 18, wherein the cure system in the polymer body comprises a sulfur cure system or a peroxide cure system.

20. The system as recited in claim 18, further comprising a step of determining the cure system is a sulfur cure system or a peroxide cure system basing on a percentage of the target atoms with the polymeric materials.

* * * * *